Feb. 24, 1970    L. C. KUN ET AL    3,496,752
SURFACE FOR BOILING LIQUIDS

Original Filed April 7, 1967    11 Sheets-Sheet 1

INVENTORS
LESLIE C. KUN
ALFRED M. CZIKK

BY

ATTORNEY

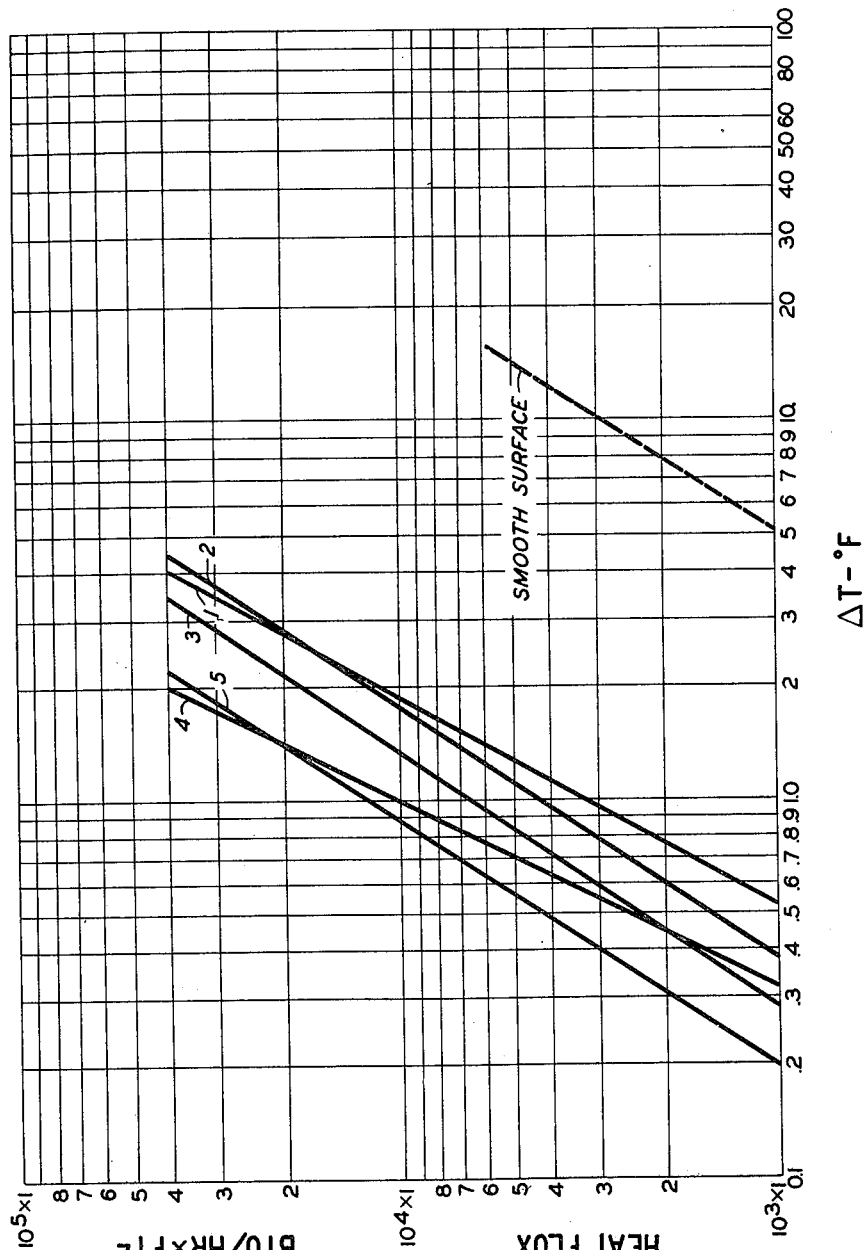

Feb. 24, 1970 L. C. KUN ET AL 3,496,752
SURFACE FOR BOILING LIQUIDS
Original Filed April 7, 1967 11 Sheets-Sheet 7
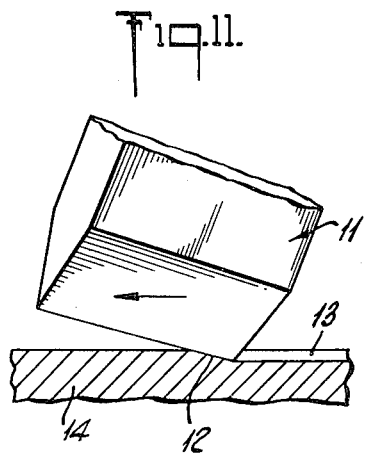
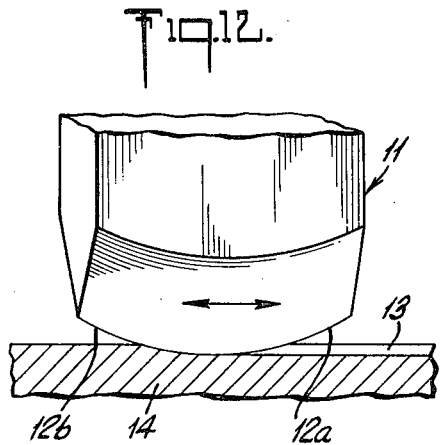
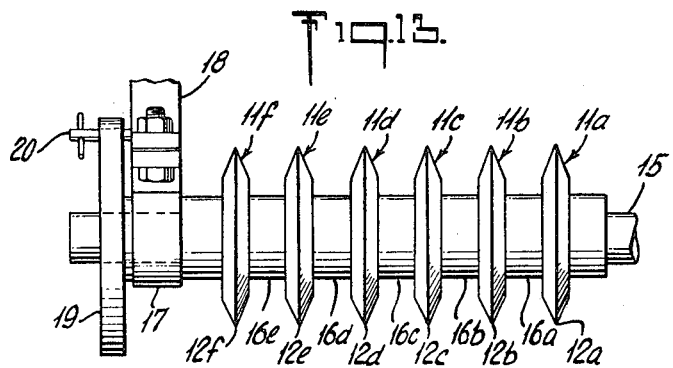
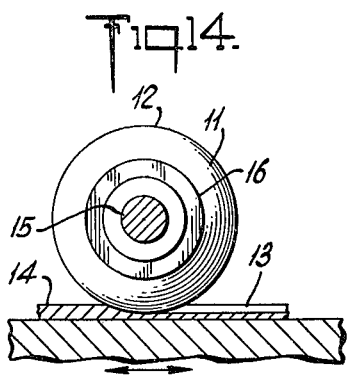
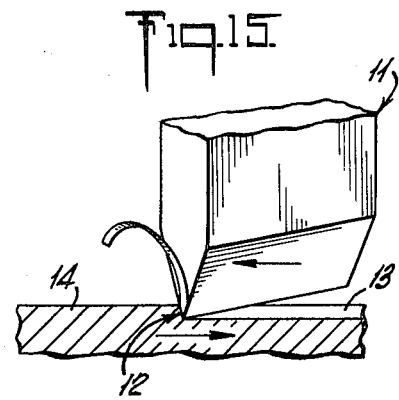
INVENTORS
LESLIE C. KUN
ALFRED M. CZIKK
BY *John C. Le Fever*
ATTORNEY

INVENTORS
LESLIE C. KUN
ALFRED M. CZIKK
ATTORNEY

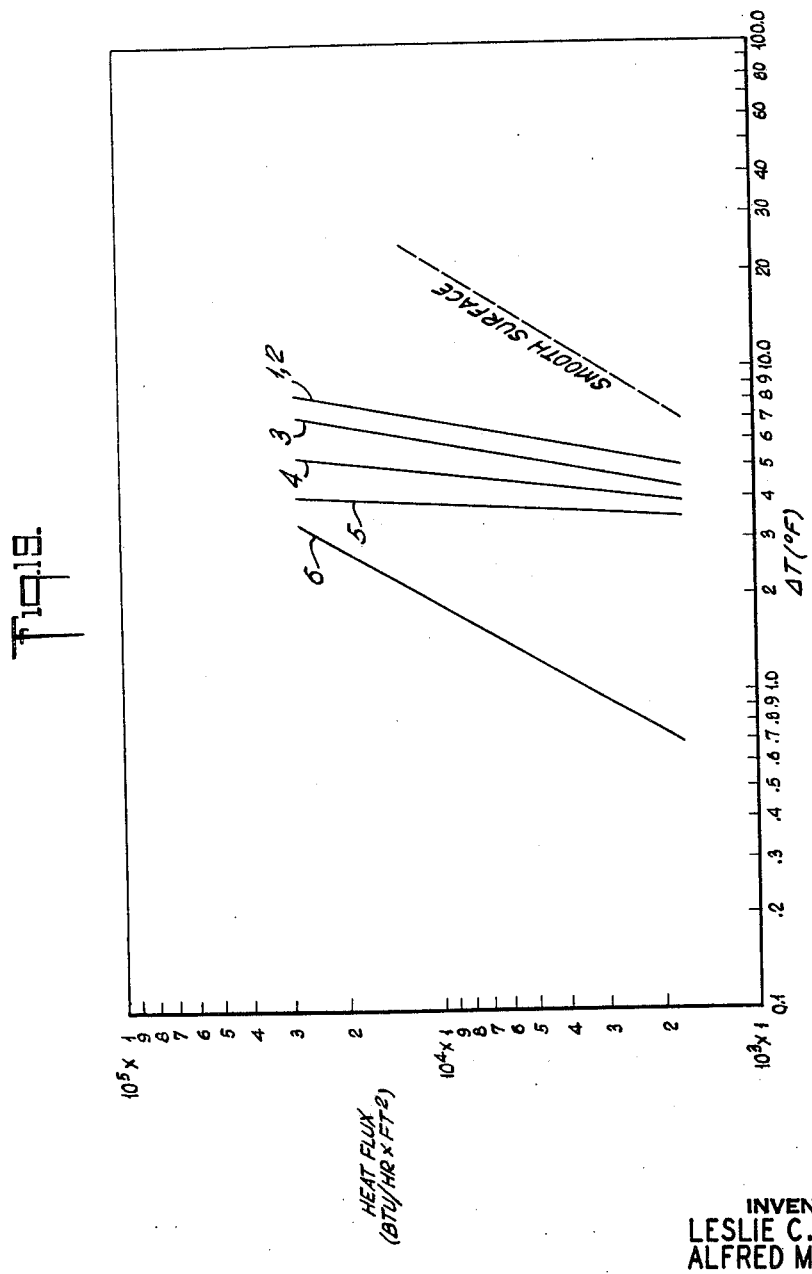

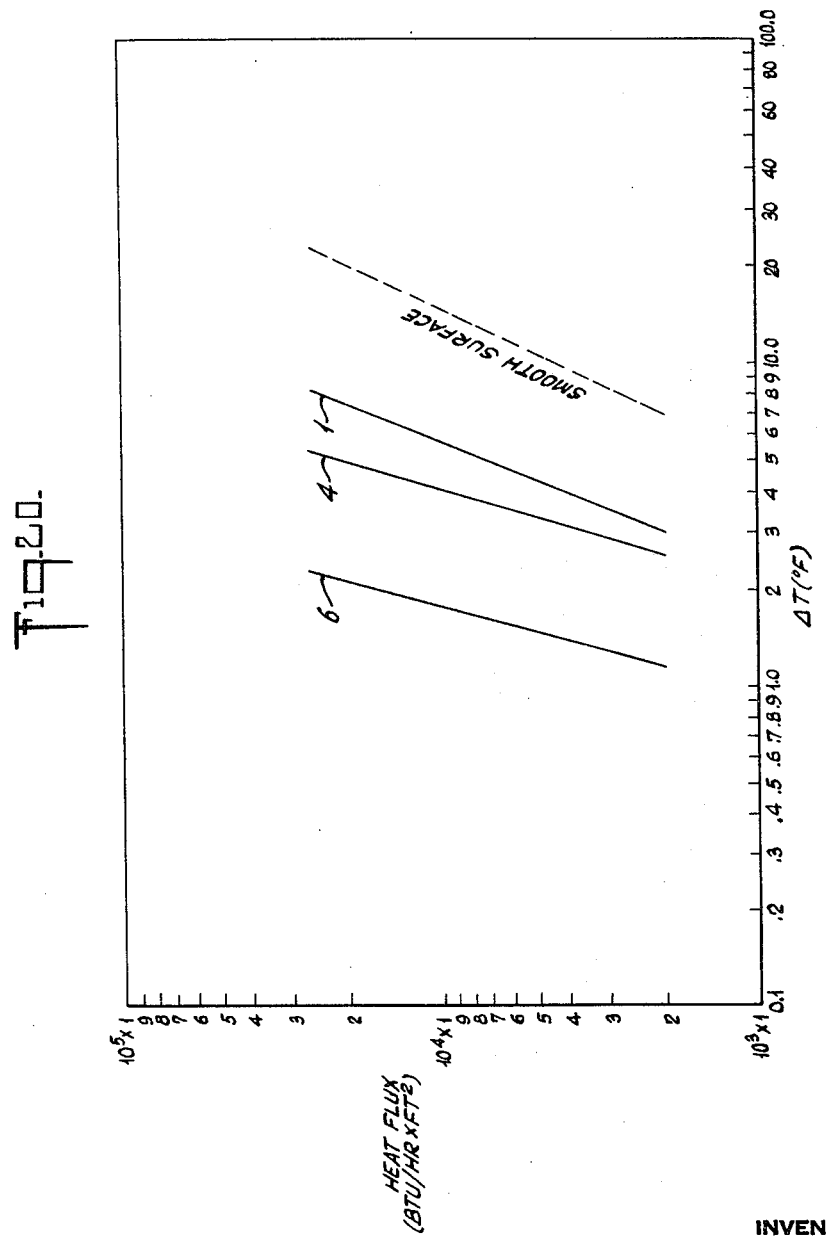

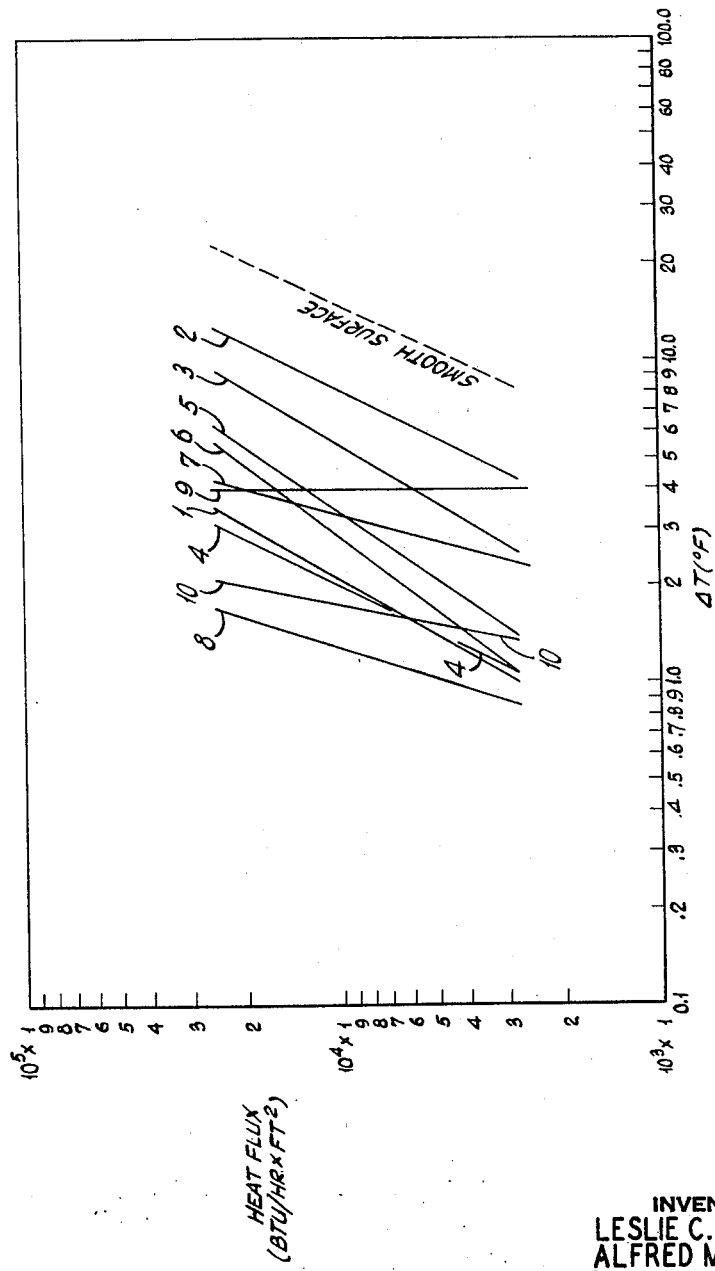

United States Patent Office 3,496,752
Patented Feb. 24, 1970

3,496,752
SURFACE FOR BOILING LIQUIDS
Leslie C. Kun and Alfred M. Czikk, Williamsville, N.Y., assignors to Union Carbide Corporation, a corporation of New York
Application Apr. 7, 1967, Ser. No. 634,403, which is a continuation-in-part of application Ser. No. 414,755, Nov. 30, 1964. Divided and this application Mar. 8, 1968, Ser. No. 726,630
Int. Cl. B21d 43/28
U.S. Cl. 72—324                                6 Claims

ABSTRACT OF THE DISCLOSURE

A boiling surface layer is formed on a thermally conductive wall comprising a plurality of ridges separated by grooves provided at microscopic density, with outer sections of the ridges partly deformed into adjacent grooves to provide sub-surface cavities with restricted openings to the outer surface and sub-surface, openings between some of the cavities.

Cross-reference to related application

This is a division of application Ser. No. 634,403 filed Apr. 7, 1967, now abandoned, which itself is a continuation-in-part of application Ser. No. 414,755 filed Nov. 30, 1964 and entitled "Heat Exchanger." The last-mentioned application is now abandoned.

Background of the invention

This invention relates to the art of improving heat transfer from heated surfaces to boiling liquids, and particularly to surfaces which enhance the phenomenon of nucleate boiling. The invention also relates to a method for forming a layer containing the surfaces.

The transfer of heat at effective rates from a heated surface to a boiling liquid in contact therewith ordinarily requires a substantial temperature difference between the surface and the liquid which greatly affects the efficiency of heat transfer. One important factor controlling this efficiency is the nature of the heated surface in contact with the liquid; it being known, for example, that smooth boiling surfaces produce low heat transfer coefficients on the boiling side. Low boiling heat transfer coefficients often severely restrict the heat transfer capacity of boiling apparatus. For example, when the heat for boiling is supplied by a vapor condensing on a smooth-walled heat transfer surface, the condensing heat transfer coefficient may easily be on the order of 2,000 B.t.u./hr. sq. ft. ° F., while the boiling heat transfer coefficient against the opposite side of the heat transfer surface may be only 100 to 200 B.t.u./hr. sq. ft. ° F. According to the familiar method of summing heat transfer resistances when the boiling and condensing heat transfer surfaces are of equal area, the overall heat transfer coefficient U is obtained approximately as follows:

$$\frac{1}{U} = \frac{1}{h_C} + \frac{1}{h_B}$$

and $$U = \frac{h_B \times h_C}{h_B + h_C}$$

where $h_B$ and $h_C$ are the boiling and condensing heat transfer coefficients respectively. It is clear that if $h_B$ is small compared to $h_C$, then the value of U approaches $h_B$ and the most of the advantage of a high condensing coefficient is lost.

Principal objects of this invention are: to provide a thermally conductive wall for transferring heat to a boiling liquid in a heat exchange apparatus having a boiling surface layer containing a plurality of cavities adapted to provide boiling nucleation sites within the surface layer; to provide a thermally conductive wall with a grooved boiling surface layer of a character which produces boiling heat transfer coefficients many times as large as those obtained with conventional smooth or roughened surfaces; and to provide a cross-grooved boiling surface layer of a character that is able to transfer to a boiling liquid large quantities of heat at much lower temperature differences than required in conventional heat exchange apparatus.

These and other objects and novel features of the invention will become apparent from the following description and accompanying drawing.

Summary

According to this invention, there is provided a heat exchange wall having a boiling surface layer formed thereon with a plurality of cavities within the boiling surface layer. These cavities are sub-surface cavities adapted to entrap vapor bubbles within the boiling surface layer to provide boiling nucleation sites. The cavities open to the outer surface of the boiling surface layer through restricted openings which have cross-sectional area smaller than the largest cross-sectional areas in the cavity interiors and which provide communication between the interiors of the cavities and the surface of the boiling surface layer for vapor egress during boiling and liquid ingress. The cavities also have sub-surface openings providing communication between the interiors of the cavities for liquid ingress to sustain growth of the entrapped vapor bubbles during the boiling process as vapor is expelled from the restricted openings.

In one embodiment of this invention, the boiling surface layer of a heat exchange wall is formed by providing a plurality of ridges in the surface of the wall, each ridge being separated from adjacent ridges by grooves at microscopic density. The outer sections of the ridges remote from the wall are partially deformed into adjacent grooves such that the aforementioned cavities are formed in the grooves. As used herein the term "microscopic" refers to objects so small or fine as to be not clearly distinguished without the use of a microscope. The individual grooves, cavities and ridges of the low groove density boiling surface layers (e.g. 20 grooves per inch) are visible to the naked eye. However the restricted openings from the cavities to the outer surface of even these layers cannot be readily distinguished without aid of a microscope. Since the cross-sectional area relationship between the cavity and the restricted opening is essential to the growth of vapor bubbles, the layers of this invention may not be clearly identified by the naked eye. It is in this sense that the grooves are provided at microscopic density.

In another, and preferred, embodiment of this invention the boiling surface layer of a heat exchange wall is formed by providing a plurality of ridges in the surface of the wall, each ridge being separated from adjacent ridges by grooves, and by providing a second plurality of depressions or grooves superimposed on the ridges at an angle to the orientation of the ridges. By superimposition of depressions or grooves on the ridges, the ridges are segmented into sections and the extent of segmentation depends in part on the relative depths of the two sets of grooves. For example, if the superimposed grooves have the same depth as the first-formed grooves, the ridge sections will tend to be completely isolated from adjacent ridge sections. The outer sections of the ridges are partially deformed into adjacent grooves such that the aforementioned cavities are formed in the grooves. This embodiment has a cross-grooved appearance.

In both of the embodiments described above, the grooves preferably extend substantially completely across the surface of the heat exchange wall and are preferably of uniform density. These two preferred conditions enhance the likelihood of uniform boiling performance across the boiling surface layer. In addition, the density of the grooves is preferably relatively high, being greater than 20 grooves per inch, for reasons that will be discussed subsequently.

Another aspect of this invention relates to a method for forming a boiling surface layer from a thermally conductive metal wall. The grooved boiling surface layer embodiments described above are preferably formed by scoring the surface of the heat exchange wall such that the wall material is substantially displaced into adjacent ridges rather than removed. When a scoring tool is used to form the boiling surface layer, the tool will tend to displace the wall material upward from the wall surface and outward away from the tool as the tool moves across the wall surface such that grooves separated by ridges are formed in the wall material. In forming the preferred cross-grooved boiling surface embodiment, a second set of grooves is scored across the first-formed grooves and ridges, at an angle—preferably 90°—to the orientation of the latter, such that the first-formed ridges are segmented into sections. This cross-scoring further displaces the wall material.

If needed, according to the method of this invention, cutting techniques other than scoring may be used to form the first set of grooves as for example milling. This novel method also contemplates forming a second set of depressions or grooves using other metal displacement techniques such as rolling or knurling.

Brief description of the drawing

FIGURE 10 is a graph showing pool boiling performance data in liquid nitrogen for a smooth aluminum surface, dashed line, and for aluminum surfaces of this invention.

FIGURE 11 is a schematic view taken in cross-sectional elevation, of single-direction scoring apparatus suitable for practicing the method of this invention for forming boiling surface layers.

FIGURE 12 is a schematic view taken in cross-sectional elevation of two-direction scoring apparatus.

FIGURE 13 is a schematic view taken in cross-sectional elevation of apparatus suitable for simultaneously scoring several grooves using a circular tool.

FIGURE 14 is an end view of the FIGURE 13 apparatus.

FIGURE 15 is a schematic view taken in cross-sectional elevation of single-direction milling apparatus.

FIGURE 19 is a graph showing pool boiling performance data in water for a smooth aluminum surface, dashed line, and for single direction scored surfaces of this invention having between 29 and 230 grooves per inch.

FIGURE 20 is a graph showing pool boiling performance data in liquid nitrogen for a smooth aluminum surface, dashed line, and for single direction scored surfaces of this invention having between 29 and 230 grooves per inch.

FIGURE 21 is a graph showing pool boiling performance data in water for smooth metallic surfaces, dashed line, and for cross-scored surfaces formed from a variety of different metal surfaces with between 45 and 225 grooves per inch.

Description of the preferred embodiments

Figure 1:
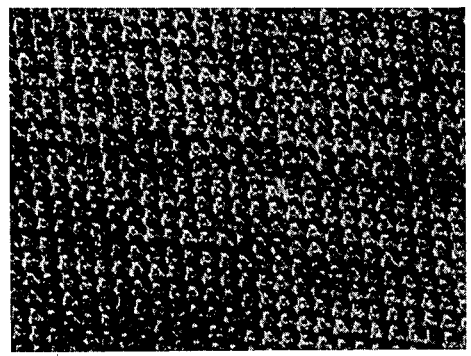
FIGURE 1 is a photomicrograph, magnification —20 fold, of the top surface of a cross-grooved boiling surface layer embodiment of this invention.

Vapor generation in nucleate boiling requires the presence of nuclei of vapor at active boiling sites. In ordinary surfaces these sites consists of micro pits or scratches which can retain gas or vapor because of their shape and their small size. However, these micro pits are relatively few in number and are not dependable because they will intermittently lose their vapor content. It is believed that the cross-grooved boiling surface of this invention performs so well because the cavities formed within the grooves dependably trap bubbles of vapor which are much larger than those found in active sites of ordinary smooth or mechanically roughened surfaces.

The essential features of the boiling surface layer of this invention are believed to be that during the boiling process vapor bubbles are permanently trapped within the cavities which serve continuously as nuclei for the formation of vapor; that a thin liquid layer is maintained between a trapped vapor bubble and the adjacent metal surface defining the cavity constituting a very low heat transfer resistance between the metal and the liquid-vapor interface; and that this liquid film is replenished to sustain growth of the entrapped vapor bubbles as vapor escapes from the cavities through the restricted openings of the cavities.

The extreme thinness of the liquid film within the cavities formed within the first set of grooves is thought to account in large part for the striking improvement in the boiling heat transfer coefficient achieved with this invention. The combination of the well known Gibbs and Clapeyron equations which relate the thermal potential required for growth of a bubble (in terms of the superheat of the liquid surrounding the bubble) to the size of the bubble states:

$$r_c = \frac{2\sigma}{T - T_s} \cdot \frac{T_s(\rho L - \rho V)}{\rho L \rho V \eta}$$

where:
$r_c$ = cavity radius
$\sigma$ = Surface tension, lbs. force/ft.
$T$ = Temperature of liquid surrounding a bubble, ° K.

$T_S$ = Saturation temperature of boiling liquid corresponding to the vapor pressure of the liquid, ° K.
$\rho L$ = Density of liquid, lbs. mass/ft.$^3$
$\rho V$ = Density of vapor, lbs. mass/ft.$^3$
$\eta$ = Latent heat of boiling liquid, B.t.u./lb.

The value of T must be greater than $T_S$ by an amount sufficient to cause a bubble of radius $r_c$ to grow against surface tension. Hence $T-T_S$ is the minimum super-heat required to sustain the boiling process. Accordingly to the Gibbs-Clapeyron equation, the superheat necessary for bubble growth is reduced, i.e. $T-T_S$ is minimized, by increasing $r_c$.

However, if one wishes to improve overall boiling performance, it will not be sufficient merely to reduce the superheat required to sustain bubble growth. The superheat $\Delta T$, $T-T_S$, correlated by the Gibbs-Clapeyron equation has been discovered to be only one of the resistances to the overall boiling process. When boiling proceeds by the formation of bubbles within cavities of a surface which comprises a heat source, a second $\Delta T$ exists across the liquid film between the wall temperature $T_W$ and the superheated vapor-liquid interface temperature T, and in effect this film $\Delta T$ is in series with the superheat $\Delta T$ of the Gibbs-Clapeyron equation. This film $\Delta T$, i.e.

$$T_W - T$$

has been unexpectedly found to increase as $r$ increases, an effect opposite to that observed for the superheat $\Delta T$, $T-T_S$.

Neglecting the thermal resistance of the material of which the surface is composed, the overall boiling process is dependent upon the total $\Delta T$, $T_W-T_S$, which is approximately the sum of the film and superheat $\Delta T$'s. The boiling surface layer of this invention represents a marked improvement in that it effectively reduces the film $\Delta T$ and is therefore characterized by performance where the film $\Delta T$ begins to lose its dominant influence.

A boiling surface layer, as described above, in operation provides a multitude of partially liquid filled, sub-surface cavities which act as nuclei for the growth of many bubbles of the boiling liquid. As the bubbles grow, vapor emerges from the cavities through the restricted openings therein due to continued generation of vapor therein, breaks away from the boiling surface, and rises through the liquid. The liquid continues its flow into the cavities through sub-surface openings to replenish the thin liquid films. The high boiling coefficient results from the fact that the heat leaving the base metal surface does not have to travel through an appreciable liquid layer before meeting a vapor-liquid surface producing evaporation.

Within the boiling surface layer, a multitude of thin-filmed bubbles are grown so that the heat, in order to reach a vapor-liquid boundary, need travel only through an extremely thin liquid layer having a thickness considerably less than the width of the confining cavity interior. Vaporization of liquid takes place entirely within the cavities and substantially no superheating of the bulk liquid is required or can occur.

With a smooth metal surface, however, only a few bubble points exist and the initiation of bubble growth requires a large degree of superheat due to the compressive force of liquid surface tension on a very small bubble. The heat for bubble growth must be transferred by convection and conduction from the smooth base metal to the distant vapor-liquid interface of a bubble which is almost completely surrounded by bulk liquid.

The above described performance of the boiling surface layer of this invention is not merely the result of increasing the surface area by, for example, mechanically roughening the surfaces. This fact was shown by a test comprising immersing a cross-grooved boiling surface layer of this invention bonded to a copper block containing embedded heating coils to boil a fluid such as liquid nitrogen. At very low heat fluxes insufficient to activate the cavities with vapor, the boiling heat transfer coefficient and the visual phenomena of bubble points were quite similar to those obtained with a smooth surface copper block. However, at higher heat fluxes producing vapor activation of the cavities, extremely high boiling coefficients were obtained which are impossible to achieve with the smooth block or with a block having thoroughly mechanically roughened surfaces. The following test results in boiling nitrogen illustrate the effect of cross-grooved boiling surfaces of this invention compared to typical prior smooth surfaces and mechanically roughened surfaces.

TABLE I

| Type Surface | $\Delta T$ required for: Q/A=1,000 B.t.u./hr./ft.$^2$ (° F.) | $\Delta T$ required for Q/A=10,000 B.t.u./hr./ft.$^2$ (° F.) | Heat Transfer Coefficient Q/A=1,000 (B.t.u./hr./ft.$^2$/° F.) | Heat Transfer Coefficient Q/A=10,000 (B.t.u./hr./ft.$^2$/° F.) |
|---|---|---|---|---|
| (1) Smooth aluminum | 5 | 25 | 200 | 400 |
| (2) Mechanically roughened by milling in one direction with neither restricted or sub-surface openings | 2.5 | 5 | 400 | 2,000 |
| (3) Mechanically roughened aluminum by cross-milling at right angles with neither restricted or sub-surface openings | 1.5 | 2.25 | 670 | 4,440 |
| (4) Aluminum prepared according to this invention to produce sub-surface cavities having both restricted openings and sub-surface openings by single-direction scoring. (Figs. 6 and 7 embodiment) | 0.5 | 1.9 | 2,000 | 5,260 |
| (5) Aluminum prepared according to this invention to produce sub-surface cavities having both restricted openings and sub-surface openings by cross-scoring at right angles. (Figs. 1 and 2 embodiment) | 0.3 | 1 | 3,300 | 10,000 |

The cross-grooved boiling surface layer shown in FIGURE 1 was formed by a scoring tool. The tool was first drawn relative to and across the surface from left to right beginning at the top of the figure. The tool was advanced relative to the surface from the top toward the bottom of the figure after formation of each groove such that a first plurality of parallel ridges separated by grooves was scored into the base material. The tool was then drawn relative to the surface across the first plurality of ridges to form crosswise grooves. The cross-wise grooves were formed by drawing the tool relative to and across the base material at substantially 90° to the orientation of the ridges, from the top to the bottom of the figure and the tool was advanced from the right toward the left of the figure after formation of each cross-wise groove such that a second plurality of grooves cross-wise to the first formed ridges to segment the ridges were produced as shown in the figure.

To understand the structure of the boiling surface layer, a photomicrograph of the surface such as shown in FIGURE 1 is not completely adequate because the sub-surface structure is not evident. To more clearly show the contour of the boiling surface layer shown in FIGURE 1 as an example, the boiling surface layer was impregnated in a plastic resin, vertically cross-sectioned at a very slight oblique angle to the orientation of the first-formed grooves, and one of the sectioned edges polished and microphotographed.

The boiling surface layer was first impregnated with a plastic resin so that the subsequent cutting and polishing will not deform the structure of the boiling surface layer.

Figure 2:
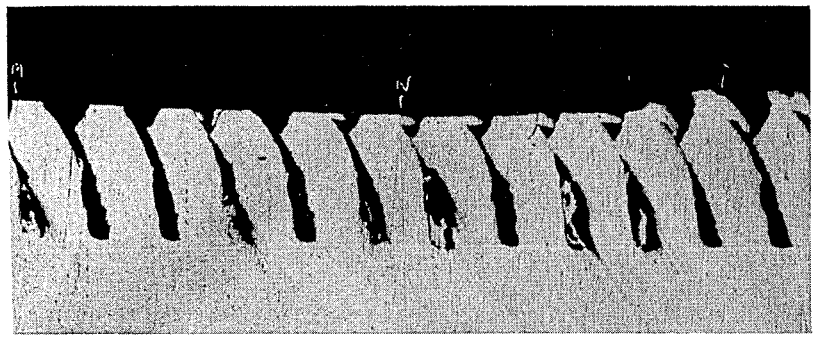
FIGURE 2 is a photomicrograph, magnification —75 fold, of a cross-section of the boiling surface layer of FIGURE 1 taken in a vertical plane approximately along the lines 2—2 in FIGURE 1.

The boiling surface layer was vertically sectioned at a very slight oblique angle to the orientation of the first formed grooves so that the vertical edges will depict the structure of the boiling surface layer in different vertical planes. The FIGURE 2 section, for example, was taken at a 95° oblique angle to the orientation of the first-formed grooves. The projections which are shown in FIGURE 2 are cross-sections of the ridges formed by drawing a somewhat blunt-ended scoring tool across the surface of a heat exchange wall after the ridges have been segmented by cross-wise scoring. Reference point 1 in FIGURE 2 indicates a cross-section of one such ridge in a plane located between two adjacent grooves formed, or superimposed, cross-wise to the ridges. Reference point 2 in FIGURE 2 indicates a cross-section of another ridge in a plane located at the middle of one of the second formed cross-wise grooves. Notice should be taken that the depth of the cross-wise grooves is very shallow compared to the depth of the grooves between the ridges and therefore the ridges are not segmented into discrete sections. The depth of the cross-wise grooves can be measured by the difference in elevations of the top of the ridge at point 1 and of the top of the ridge at point 2. Reference point 3 in FIGURE 2 indicates a cross-section of still another ridge in a plane located along the back edge of one of the second-formed cross-wise grooves. Thus, the cross-section in FIGURE 2 shows, from right to left, the structure of the ridges of the boiling surface layer in a series of planes beginning between adjacent cross-wise grooves (at the right) and progressing into an adjacent groove (in the center) and through that groove to the back wall thereof (at the left). This structure repeats itself from one edge of the boiling surface layer to the opposite edge. Therefore the structure shown in FIGURE 2 permits one to construct a mental image of the structure of each ridge by mentally arranging the ridge cross-sections one atop the other from left to right. This is the advantage of making a vertical cross-section at a very slight oblique angle to the orientation of the first-formed grooves. The subsurface cavities in the boiling surface layer of FIGURES 1 and 2 consist of almost completely enclosed tunnels along the bottom of the first-formed grooves. The second set of cross-wise grooves is very superficial and the shape of the first-formed grooves and ridges appears to be almost independent of the superimposition of the second set of grooves on the ridges. However, at point 2 in FIGURE 2 corresponding to the location of the bottom of a second-formed groove, the structure of the upper section of the ridges appears to be modified such that the first-formed groove is almost completely closed. Near points 1 and 3 of FIGURE 2 corresponding to locations between adjacent cross-wise or second-formed grooves, the upper sections of the ridges do not appear to have been affected by the cross-wise grooves and there exists an opening to the surface that is larger than the space between the ridges near points 1 and 2. It also appears that the tunnel-like cavity is larger near point 2 beneath the cross-wise groove than at points 1 and 2.

Figure 3:
FIGURE 3 is a photomicrograph, magnification —40 fold, of a cross-section of a boiling surface layer similar to that shown in FIGURES 1 and 2 taken in a vertical plane in the same manner as FIGURE 2.

FIGURE 3 is a cross-section of a cross-grooved boiling surface layer which was taken in the same manner as the FIGURE 2 cross-section but from a separate boiling surface layer and was formed with a sharper-ended scoring tool. The repeating nature of the cross-sectioned structure is more evident in FIGURE 3 than in FIGURE 2. The ridge at point 6 is located at a plane between adjacent cross-wise grooves and the bottoms of these adjacent cross-wise grooves are readily noted. The depth of the cross-wise grooves is approximately one half the depth of the grooves between the first-formed ridges.

The sub-surface cavities shown in FIGURE 3 do not appear to be tunnel-like as in FIGURE 2. Rather, the cavities of FIGURE 3 appear smallest beneath the cross-wise groove, to a point between another two cross-wise grooves. Furthermore, unlike the cavities of FIGURE 2, the cavities of FIGURE 3 appear smallest beneath the cross-wise grooves. The superimposition of the second-formed cross-wise grooves appears to have a significant effect on the shape of the cavities. Thus, the cavities of FIGURE 3 extend in an enclosed form from either side of a point beneath cross-wise grooves to points on opposite sides between such cross-wise grooves where they open to the surface. The cavities do not appear to be continuous tunnels as in FIGURE 2.

A feature that is common to the cavities of both FIGURE 2 and FIGURE 3 is that the structure is such that there exists restricted openings through which vapor could escape during boiling without losing vapor bubbles entrapped within the cavities. Another feature is that there are also other openings through which liquid can enter to replinish the thin liquid films between the entrapped vapor bubbles and the enclosing material of the boiling surface layer. Another characteristic that is common to the cavities of both FIGURE 1 and FIGURE 2 is that not all of the cavities will be capable of entrapping vapor bubbles, or of releasing vapor, or the like because of imperfections caused during formation of the boiling surface layers. However, boiling surface layers formed in the manner of those of FIGURES 1-3 contain many tens-of-thousands of potentially active sites and the actual percentage of active sites may indeed be relatively small in order to account for the phenomenal boiling heat transfer capability, that these surfaces have.

Figure 4:
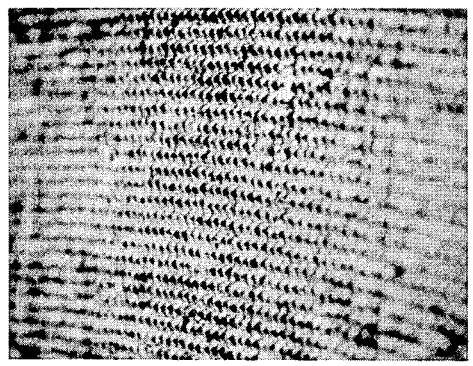
FIGURE 4 is a photomicrograph, magnification —20 fold, of the top surface of another cross-grooved boiling surface layer embodiment of this invention.

The cross-grooved boiling surface layer shown in FIGURE 4 was also formed by a scoring tool. The tool was first drawn across the surface from right to left and the tool advanced from bottom to top to form a first plurality of ridges separated by grooves. The tool was then drawn across the first plurality of ridges, at substantially 90° to the orientation of the ridges, from top to bottom and the tool advanced from right to left to form a second plurality of grooves cross-wise to the first formed ridges to segment the ridges as shown in the figure. The microphotograph was taken at an angle to the plane of the surface in the direction of tool advance during formation of the first-formed ridges to more clearly show the structure. The cavities formed in the boiling surface layers of FIGURE 4 have a considerably different appearance than in the embodiments of FIGURES 1-3. The cavities of FIGURE 4 appear to be partially cup-shaped. It appears that one can ascertain a multitude of cavities shaped roughly like halves of cups.

Figure 5:
FIGURE 5 is a photomicrograph, magnification —40 fold, of a cross-section of still another boiling surface layer embodiment taken in a vertical plane.

FIGURE 5 is a vertical cross-section of a boiling surface layer viewed in the same manner as the FIGURE 2 cross-section but taken from still another boiling surface layer. The first set of grooves is clearly much deeper than the second set, as previously shown in the FIGURES 1-2 surface. A distinguishing feature of the FIGURE 5 surface is that the restricted openings to the outer surface are formed by the overlapping outer deformed sections of the ridges. In the FIGURES 1-2 embodiment the restricted openings are formed by lateral deformation of the entire ridges.

Figure 6:
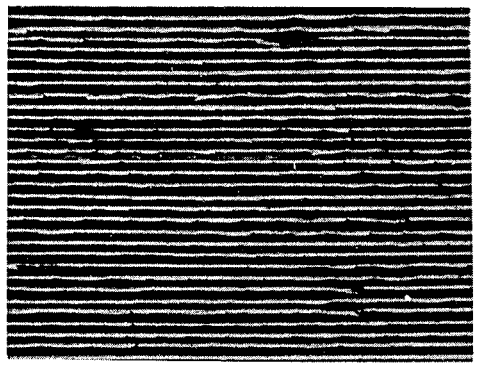
FIGURE 6 is a photomicrograph, magnification —20 fold, of the top surface of a single direction grooved boiling surface layer embodiment of this invention.

FIGURE 6 shows a single-direction grooved surface embodiment of a boiling surface layer formed by a scoring tool. The tool was drawn across the surface from right to left and the tool advanced from bottom to top to form ridges separated by grooves.

Figure 7:
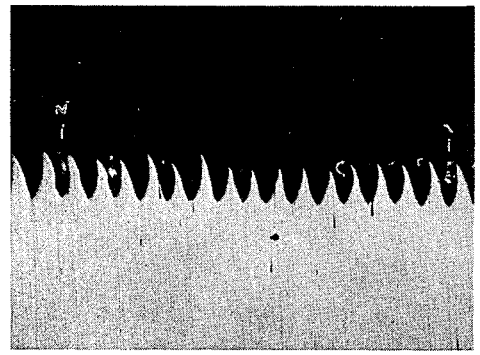
FIGURE 7 is a photomicrograph, magnification —40 fold, of a cross-section of the boiling surface layer of FIGURE 6 taken in a vertical plane approximately along the lines 7—7 in FIGURE 6.

FIGURE 7 shows a vertical cross-section of the boiling surface layer of FIGURE 6 at right angles to the ridges and grooves. The FIGURE 7 cross-section was taken in the same manner as the FIGURE 2 cross-section.

Figure 8:
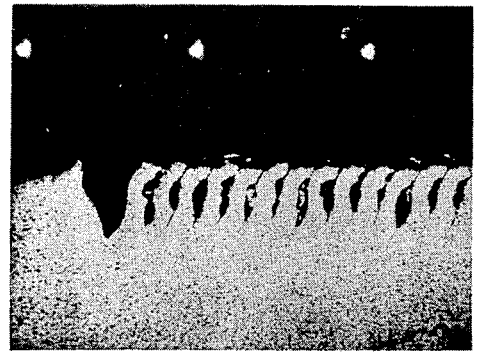
FIGURE 8 is a photomicrograph, magnification —40 fold, of a cross-section of a boiling surface layer similar to that shown in FIGURES 6 and 7 taken in a vertical plane in the same manner as FIGURE 7.

FIGURE 8 is a vertical cross-section of another single direction grooved-surface embodiment of a boiling surface layer taken in the same manner as the FIGURE 7 cross-section but from another boiling surface layer.

Restricted-opening cavities are most clearly evident in FIGURE 7 in the cavities just to the left of point 1. In these tunnel-like cavities, the upper sections of the ridges are deformed into adjacent grooves leaving a restricted opening to the surface. In FIGURE 8, tunnel-like cavities are also apparent but are more similar to those of FIGURE 2 than of FIGURE 7.

The boiling surface layer of FIGURE 8 was formed by the scoring tool advancing from right to left with the last groove being formed at the left. Whereas in FIGURE 5 the scoring tool was held normal to the work, in FIGURE 7 the tool was inclined away from the grooves toward the direction of advancement at an angle of 10° from perpendicular, called herein for convenience a plus (+) angle. The structure shown in FIGURE 8 was caused by the scoring tool deforming the near (toward the direction of advancement) ridge of an adjacent proceeding groove into that proceeding groove during the scoring of the next succeeding grooves. The various boiling surface layer structures shown in FIGURES 1-8 were formed in the same manner. The differences in appearance are due to such variables as groove density, depth of the scored grooves, angle of tool inclination, speed at which the tool is moved through the material, the type of lubricant—if any—employed during scoring, configuration of the tip of the scoring tool. For example, scoring to a greater depth at a particular groove density will result in a greater degree of deformation. Likewise, inclining the scoring tool over the just-scored material at a minus (−) angle, or at a larger plus (+) angle, will also result in a greater degree of deformation. Further, a given high performance can be obtained with a lower groove density by cross-grooving since there will tend to be more deformation than by single-direction grooving.

Although the boiling surface layers shown in FIGURES 1-8 were produced on a flat heat exchange wall, these boiling surface layers could be produced on a curved surface such as a surface of a heat exchange tube.

A preferred method of constructing a boiling surface layer of this invention is to form sets of parallel grooves by cross-scoring such that the metal is displaced rather than removed. Thus, in forming the parallel grooves of a first set, the scoring tool will tend to displace metal upward and outward. When the parallel grooves of a second set are then superimposed on the first set, the previously displaced metal in the first set of grooves will be displaced again resulting in the partial closure of the first set of grooves to form cavities which are enlarged below the metal surface and have restricted openings in their outer portions.

To further enhance the capacity of the grooves of the first set to transport liquid to the cavities and to aid in the formation of the cavities themselves, it is also preferred to produce the first set of grooves with a greater depth than the depth of the second set of grooves. This tends to result in cavities produced at the bottom of the first set of grooves which are partially closed at the top by metal which is displaced when the second set of grooves are superimposed thereon. This is believed to provide undisturbed channels interconnecting the cavities below the surface and to contribute to an undercut geometry conducive to the entrapment of vapor within the cavities.

It is also preferred to produce the grooves of the first set with a tool inclined to the boiling surface such that the grooves so formed are inclined. The second set of grooves are then preferably produced by a tool moving in a direction relative to the inclination of the first set of grooves to aid in the formation of the cavities having restricted openings thereto.

The location of the cavities depends at least in part on the relative depths of the two sets of grooves. It has been observed that the superimposition of a second set of grooves across a first set at about the same depth by means of a scoring tool produces cavities within the grooves of the first set and between the grooves of the second set. It has also been observed that the superimposition of a second set of grooves at a relatively shallow depth by means of a scoring tool produces cavities within the grooves of the first set and beneath the grooves of the second set. Also, by scoring the grooves of the second set at an intermediate relative depth, cavities have been formed within the grooves of the first set beneath and between the grooves of the second set. In each of the above examples, the superimposition of the second set of grooves by means of the scoring tool appeared to constitute an important factor in the production of the restricted openings to the outer portions of the multiple cavities. This formation of the restricted openings appeared to result from the displacement of the side walls of the grooves of the first set as the scoring tool moved across the first set of grooves to form the grooves of the second set.

An important variable in the preferred structure of this invention is the groove density. A relatively high groove density aids in the formation of smaller cavities which function better in boiling liquids having relatively low surface tensions such as liquid oxygen and nitrogen. For these two liquids, and for liquids having similar surface tensions, a groove density of between 140 and 200 grooves per inch is preferred. A relatively low groove density aids in the formation of larger cavities which function better in boiling liquids having relatively high surface tensions such as water. For ths liquid, and for liquids having similar surface tensions, a groove density of between 20 and 120 grooves per inch is preferred. Cavities for boiling liquids having surface tensions intermediate water and liquid oxygen and nitrogen would be preferably formed in surfaces having groove densities intermediate the foregoing values.

The foregoing groove density values are merely preferred inasmuch as optimum sized cavities are formed therein. However, the boiling surfaces of this invention designed for example to boil liquid nitrogen could be used to boil water and the performance in water would be considerably superior to a smooth surface even though an optimum cavity size was not employed.

As a general rule the lowest groove density should be chosen which will provide or achieve the desired performance. This is because lower groove densities tend to provide more massive and rugged ridges less prone to damage by corrosion or erosion with lowest machining costs.

Table II lists the physical data for boiling surface layers shown in FIGURES 1-8.

TABLE II

| Figure | Grooves per inch [1] | Tip angle of scoring tool | Depth of first formed grooves | Depth of second-formed cross-wise grooves | Angle of scoring tool inclination + or minus [2] |
| --- | --- | --- | --- | --- | --- |
| 1 and 2 | 140 | 30° | 16 | 2.5 | +10° |
| 3 | 208 | 30° | 11 | 8 | +10° |
| 4 | 160 | 45° | | | +10° |
| 5 | 60 | 30° | 23 | 8 | +10° |
| 6 and 7 | 230 | 30° | 8 | 0 | +10° |
| 8 | 230 | 30° | 12.5 | 0 | 0° |

[1] Groove density the same for both sets of grooves in cross-grooved boiling surface layers.
[2] A plus (+) angle indicates that the scoring tool was inclined in the direction of tool advance; a minus (−) angle indicates that the scoring tool was inclined opposite to the direction of tool advance.

Figure 9:
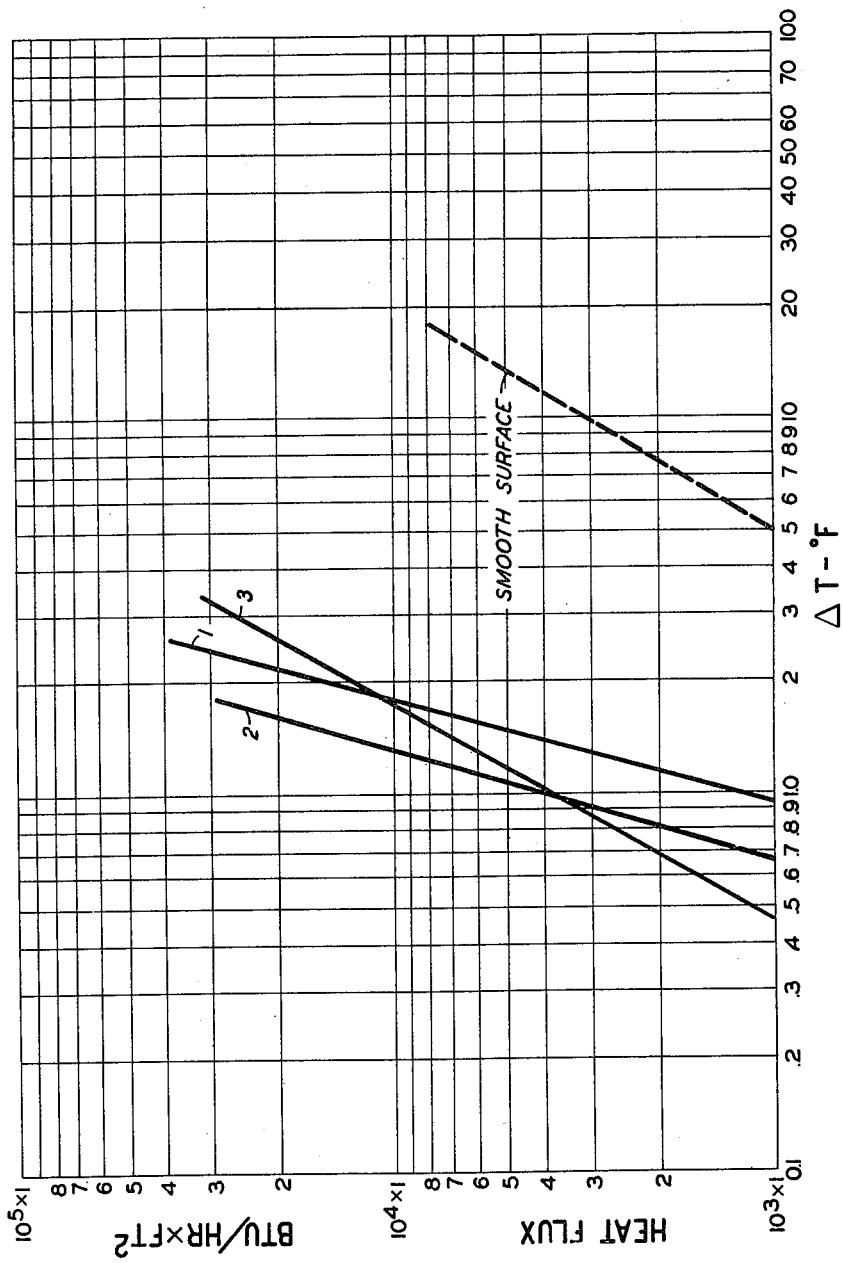
FIGURE 9 is a graph showing pool boiling performance data in water for a smooth aluminum surface, dashed line, and for aluminum surfaces of this invention.

FIGURES 9 and 10 exemplify the pool boiling heat transfer performance of boiling surface layers of this invention compared to a smooth surface. FIGURE 9 plots test results in water and FIGURE 10 plots test results in liquid nitrogen.

In FIGURE 9, the performance of the single-direction grooved aluminum boiling surface layer shown in FIGURES 6-7—curve 1, is shown as well as the performance of a typical cross-grooved aluminum boiling surface layer —curve 2. The latter was scored with the first grooves 15 mils deep and with the second grooves 11 mils deep in a direction normal to the first grooves, both sets being provided at a density of 100 grooves per inch. Curve 3 represents performance of the copper boiling surface illustrated in FIG. 5 and described in Table II. In terms of the temperature difference required as a driving force to transfer any particular quantity of heat, the two aluminum boiling surface layers shown by curves 1 and 2 are over 5 times superior to a smooth aluminum surface. Furthermore, the greater slope of curves 1 and 2 indicate the surfaces of this invention become more active faster than a smooth surface.

In FIGURE 10, the performance of: the single-direction grooved aluminum boiling surface layer shown in FIGURES 6–7—curve 1; and the cross-grooved aluminum boiling surface layers shown in FIGURE 4—curve 2, FIGURE 3—curve 3, and FIGURES 1 and 2—curve 4 are compared to a smooth aluminum surface. In terms of the temperature difference required as a driving force to transfer any particular quantity of heat, the boiling surface layers of this invention are well over 50 times superior to a smooth aluminum surface.

Cross-grooving at relatively deep penetrations at high groove densities results in an extreme degree of groove interference and metal displacement. The boiling surface layers so produced exhibit random rather than uniform orientation of the boiling surface layers and the metal forming this surface layer is somewhat fragile. Nevertheless, the performance of such boiling surface layers is very high as shown in curve 5 in FIGURE 10. This aluminum boiling surface layer has a cross-groove density of about 230 grooves per inch for both sets of grooves and a groove depth of about 10 mls. for both sets of groves. Such surfaces have especial utility in boiling low surface tension fluids such as the cryogens.

The vast improvement in boiling performance of this invention in liquid nitrogen is applicable to all cryogens in general and hence the boiling surface layers of this invention will have especial utility in heat transfer processes involving the boiling of cryogenic liquids. The more modest—but nevertheless significant—improvement in boiling water indicates that this invention will have significant utility in such processes as the desalination of sea water by distillation where small temperature differentials and high efficiency are desired.

According to a method aspect of this invention a grooved surface boiling layer is formed by cutting a series of parallel grooves at microscopic density in a thermally conductive metal wall so as to form first ridges separating adjacent grooves. Another series of parallel second grooves are then cut at microscopic density in the wall at an angle to the orientation of the first ridges so as to form second ridges separating adjacent second grooves. During the second cut a plurality of sub-surface cavities are formed in the first groove communicating with the outer surface through restricted openings having smaller cross-sectional area than the largest cross-sectional area of the cavity interiors. Also during this second cut, sub-surface openings are formed between at least some adjacent cavities providing vapor communication therebetween.

As previously indicated, the grooved boiling surface layers of this invention are preferably formed by scoring—the cutting method in which the tool "slices" through the work with a sharp edge thereby displacing rather than removing metal from its path. Stated otherwise, with scoring the metal is displaced outwardly and approximately normal to the direction of relative movement between the tool and work. Scoring produces grooves which may not be clean-cut but instead may contain many burrs, metal fragments and a high degree of surface roughness. It has been found that best results are obtained when the scored surface is simply cleaned in an appropriate solution such as acetone to remove only loose metal particles. The firmly attached rough projections should not be removed as they frequently constitute part of the reentry cavity configuration producing the characteristically high performance.

An attractive use for scored boiling surfaces is in plate-and-fin heat exchangers where the surface treatment is applied on the flat parting sheets which separate the narrow passages. Flat plates and sheets are conveniently scored by holding them firmly down against the flat bed of a planing mill and mounting the tool in conventional fashion on a fixed gantry above the work. The surface is scored as the bed moves the work horizontally under the tool. After each scoring stroke of the machine, the tool is indexed laterally a few thousandths of an inch into position for the next adjacent groove. For accurate grooving a tight machine is required with very little vibration in the tool holder and indexing mechanisms.

An alternative machine for scoring flat sheets in a shaper, on which the work is held firmly against the fixed bed and the tool moves horizontally over the work. After each scoring stroke, the work is indexed into position for the next groove.

FIGURES 11–14 illustrate scoring tools suitable for preparing the grooved boiling surfaces. FIGURE 11 shows tool 11 with a single cutting edge 12 which scores in one direction only to form groove 13 in wall 14. When in use, the tool scores a full-length groove across the wall, and then lifts or swings free while the tool or work is returned to the original starting position. The next adjacent groove is then scored.

FIGURE 12 shows a double bit tool 11 with two symmetrical cutting edges 12a and 12b arranged to score in either direction. The tool 11 scores one groove 13 as the machine moves in one direction and immediately scores an adjacent groove on the return stroke of the machine. In this manner, the scoring operation is less costly and time consuming.

FIGURES 13 and 14 illustrate another tool arrangement designed for faster scoring. A group of tools 11a–11f are mounted on shaft 15 and accurately separated by cylindrical spacers 16a–16e. Each tool is disk-shaped with a cutting edge 12a–12f provided around its full periphery. All tools are keyed or locked to the shaft 15. The latter is held in bearing 17 which in turn is mounted on the tool holder-and-indexing mechanism 18 of a machine similar to a planning mill. A disk or gear 19 is keyed to the end of shaft 15, and is provided with pin 20 insertable through holes or teeth in disc 19 and into a recess provided in the rigid tool holder 18. In this manner the tools are fixed against rotation and as the bed 20 moves the work 14 under the tool assembly, multiple grooves 13 are scored in the surface on each scoring stroke. Since the tool cutting edges are symmetrical toward either direction of work movement a second multiplicity of grooves may be scored on the return stroke of the machine.

When the cutting edges of the tool assembly become worn at one radial position, pin 20 is removed and the assembly is rotated a few degrees to present a fresh set of cutting edges to the work. The assembly is then locked again by reinserting pin 20 through another hole now aligned with the pin recess in member 18.

There are two ways that the tool can strongly influence the type of surface generated during scoring. One is the angle of tool inclination (discussed previously) and the other is the included angle of the tool's tapered cutting edge. A large bit angle tends to produce wide grooves while a small bit angle produces narrow, slit-like grooves. The bit angle also determines the extent to which metal will be displaced into an adjacent parallel groove. Aside from its influence on the groove, the bit angle also affects tool life; tools with very small angles are prone to chip with the result that tool life is prohibitively short. It has been found that the included angle of the scoring tool bit should be between 20° and 45°, with 20–30° preferred.

The grooved boiling surface layers of this invention may alternatively be produced by other cutting methods, as for example milling. In contrast to the preferred scoring method, milling removes at least a portion of the metal from the groove in the form of chips or shavings. This metal is removed in a direction parallel to the direction of relative movement between the tool and work. The cutting edge of the tool which bites into the metal is blunt, so as to remove the metal from the groove as cleanly as possible.

Figure 16:
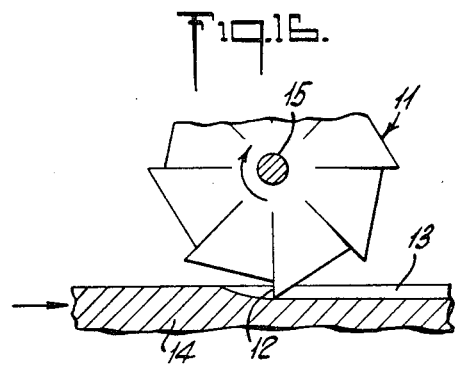
FIGURE 16 is a schematic view taken in cross-sectional elevation of apparatus suitable for milling the boiling surface layer according to the method of this invention using a rotary cutter.

FIGURES 15 and 16 illustrate preparation of the grooved boiling surface layers by milling. In FIGURE 15, tool 11 with a single blunt cutting edge 12 mills in one direction only to remove shavings. The differences between milling and scoring will be apparent by comparing FIGURE 11 with FIGURE 15.

Whereas in FIGURE 15 the milling tool 11 moves parallel to wall 14, FIGURE 16 shows rotary milling tool 11 with the wall (work) moving horizontally beneath the wheel. As illustrated the movement of the cutter blades is opposed to the work movement. Alternatively the cutter blade may be reversed and move in the same direction as the work. Both procedures remove metal in the form of clean chips.

This invention also contemplates forming the second act of depressions or grooves by deforming techniques other than scoring or milling. In some instances the first set of grooves may be cut without restricted openings from the cavity interiors to the outer surface of the wall, or alternatively the openings may not have as restricted cross-sectional areas as desired for effective vapor bubble entrapment. In either situation, a second deforming step may be used to partially smash in the ridge top surfaces and thereby reduce the cross-sectional area of the openings. This second deforming step may for example be performed by rolling smooth member of circular cross-section across the surface at 90 degree orientation to the first set of grooves and ridges. It will be apparent that if the roll contacts all of the ridges with equal force, the entire top surface of the ridges is depressed and there will be no distinct second set of depressions. If the roll contacts only part of the ridge top surfaces, that part will form the second set of depressions as distinguished from the higher unsmashed ridge portions.

Figure 17:
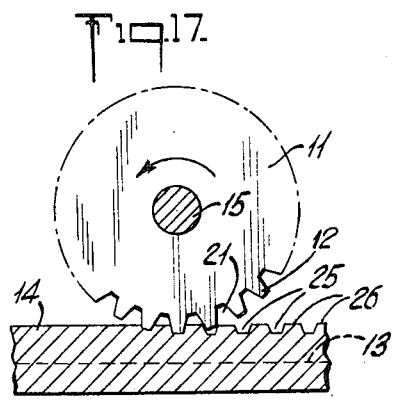
FIGURE 17 is a schematic view taken in cross-sectional elevation of apparatus suitable for cross knurling the first groove set.
Figure 18:
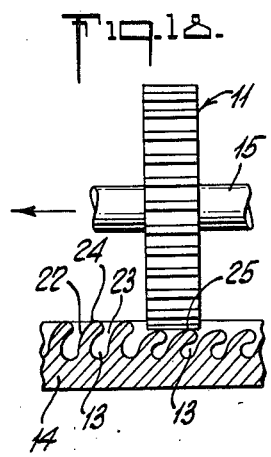
FIGURE 18 is an end view of the FIGURE 17 apparatus.

Still another technique for forming the desired vapor reentry cavity contour is by knurling the metal wall containing the first set of grooves and ridges, preferably at 90 degrees orientation thereto. FIGURES 17 and 18 illustrate the knurling embodiment in the form of wheel 11 having knurl teeth 12 on at least a portion of its circumference spaced by valleys 21 and mounted on shaft 15.

The as-formed first grooves 13 in wall 14 are separated by ridges 22, and openings 23 communicate with the outer surface (see left side of FIGURE 18). In the knurling operation wheel 11 is positioned so that teeth 12 impinge and smash in the top surface 24 of ridge portions to form second rows of depressions 25 at an intermediate level between the cavity base of first grooves 13 and the top surface 24 of the unsmashed ridge portions.

Wheel 11 is preferably aligned perpendicular to the first grooves 13 and ridges 22 (see FIGURE 18) so that the resulting second depression rows 25 are oriented 90 degrees from the first grooves. When the knurling wheel 11 has completed its run across the surface from one side to the other, it may be indexed forwardly towards the opposite end of the work to downwardly smash portions of the next ridge tops. It will be apparent from the foregoing description and FIGURES 17 and 18 that the unsmashed portions 26 of ridges 22 fall beneath the valleys 21 between teeth 12. These unsmashed portions do not close the openings 23 to the extent that the downwardly smashed portions 25 form restricted openings.

In all of the embodiments heretofore described, the boiling surface layer is formed from the heat exchange base wall by metal removal and displacement. It is also contemplated that such layer could be partially or completely formed from material attached to the heat exchange base wall, as by metal bonding. For example, open parallel grooves might be cut in one direction and a perforated sheet or screen bonded thereto with the perforations or spaces enclosed by the screen strands serving as the restricted openings. It might also be possible to prepare the boiling surface layer by first positioning a series of parallel spaced strands directly on the smooth heat exchange wall, the strands being formed of corrodible or decomposible material. Then a layer of non-corrodible metal might be cast over and between the aligned strands followed if necessary by sufficient grinding to expose the top of the oriented strands. The exposed strands would then be removed as by leaching, leaving cavities surrounded by the non-corrodible metal layer.

Still another possible method for preparing the boiling surface layer is by applying multiple layers of screening or wires, perhaps of different diameters and with different orientations.

It is emphasized that the preparative method must produce a layer having the previously described essential characteristics if the remarkably high boiling heat transfer coefficients are to be obtained. There must be a plurality of ridges separated by grooves provided at microscopic density to form cavities adapted to entrap vapor bubbles and provide boiling nucleation sites. The cavities must communicate to the outer surface of the layer through restricted openings having smaller cross-sectional area than the largest cross-sectional area of the cavity interiors. Finally, there must be subsurface openings between at least some adjacent cavities providing fluid communication therebetween.

The performance advantages of this boiling surface layer as compared to smooth surfaces are also demonstrated in the FIGURE 19 and 20 graphs for single direction scored surfaces in boiling water (FIGURE 19) and boiling liquid nitrogen (FIGURE 20) for a wide range of groove densities between 29 and 230 grooves per inch. These particular fluids are selected as representing those characterized by low surface tension (liquid nitrogen) and high surface tension (water) spanning a wide temperature range of between $-196°$ C. and $100°$ C.

The boiling surface layers were all formed from aluminum sheeting using scoring tools similar to those illustrated in FIGURE 11 and 12, and all parameters were identical except the groove spacing. The groove depth was nominally 8 mils, that is, the scoring tool and the wall were positioned to cut grooves at this depth. The included angle of the scoring tool tip was 30 degrees and the scoring tool inclined angle to the wall was $+10$ degrees. The number of grooves per inch was nominal, in that the scoring assembly was set to cut the designated number of grooves. This is the same criteria used to designate the groove density throughout the disclosure and claims. The single-direction scored aluminum surface used in the water and liquid nitrogen pool boiling tests summarized in FIGURE 19 and 20 are as follows:

TABLE III

| Surface No. | Grooves per inch |
|---|---|
| 1 | 29 |
| 2 | 45 |
| 3 | 70 |
| 4 | 100 |
| 5 | 140 |
| 6 | 230 |

FIGURE 19 demonstrates that with even the relatively low groove densities of surfaces 1 and 2, a very significant improvement is afforded over smooth surfaces. For example if a heat flux $5 \times 10^3$ B.t.u./hr.-ft.$^2$ is required in a given system, this level may be achieved with a $\Delta T$ of about $6°$ F. whereas the smooth surface requires a $\Delta T$ of about $13.5°$ F. The improvement is even greater with higher heat fluxes, primarily due to the steep slopes of the boiling surface layers as contrasted with the lower slope of the smooth surface. It should be noted that although the highest groove density (surface 6) affords the lowest $\Delta T$ values for a given heat flux, the slope of this surface is appreciably lower than for the lower groove densities (surface 1–5). At relatively high heat fluxes these curves demonstrate that surface 6 is only marginally superior to surfaces 4 and 5, and the latter would be preferred for water boiling due to their lower fabricating costs and higher durability. A probable explanation for this phenomenon is the relatively high surface tension of water, whereby vapor bubbles may be retained in relatively large cavities characteristic of relatively low groove densities.

FIGURE 20 demonstrates a very substantial improvement for the single-direction scored aluminum surfaces in boiling liquid nitrogen. For example at a heat flux of $1 \times 10^4$ B.t.u./hr-ft.$^2$, the smooth surface requires a $\Delta T$ of about 15° F. whereas the $\Delta T$ values for surfaces 1, 4 and 6 are respectively as follows: 5.8, 4.1, and 1.8. It will be apparent from FIGURE 20 that the slope for surface 6 (highest groove density) is about the same as for surface 1 (lowest groove density) along with the former's substantially superior performance, reflecting a preference for smaller reentrent cavities for relatively low surface tension liquids such as nitrogen.

FIGURES 19 and 20 (in addition to FIGURES 9 and 10) demonstrate that the boiling surface layer affords outstanding performance for boilable liquids of any surface tension, whether relatively low or high.

FIGURE 21 illustrates the performance of ten different cross-scored surfaces with between 45 and 225 grooves per inch for boiling liquid nitrogen at −196° C. The surfaces were formed from six different metals as follows: copper (surface 1), a low copper-high nickel alloy with 3% Fe, Mn and trace elements (surfaces 2 and 3), nickel (surface 4), 70% Cu-30% Ni (surface 5), 90% Cu-10% Ni (surface 6) and aluminum (surfaces 8, 9 and 10). The surfaces were all scored using tools very similar to those illustrated in FIGURES 11 and 12, and the second set of grooves were cut at 90 degrees orientation to the first set of grooves and ridges. The parameters used in preparing surfaces 1–10 by the method of this invention are summarized in Table IV as follows:

ilustrated in FIGURE 5 and identified in Table IV as surface 1 having 60 grooves per inch was used in a continuously circulatory system to boil three different simulated sea water solutions at a constant heat flux of 5,000 B.t.u./hr-ft.$^2$. The alkalinity was about 100 p.p.m. and the concentration factor was 2.5 to 3.0. Concentration factor is defined as the ratio of the solution's salinity to that of normal sea water. The first solution was selected to contain sufficient $CaCO_3$ scale for precipitation, the pH value being about 0.5 pH units above the saturation pH of 6.9. Under these conditions the boiling coefficient deteriorated from about 3,000 to about 500 B.t.u./hr-ft.$^2$-° F. Addition of 0.5% HCl caused the $CaCO_3$ scale to dissolve with the evolution of $CO_2$, and the coefficient returned to about 3,000. Based on the amount of HCl added, it was estimated that 2–5 grams of $CaCO_3$ deposited on the boiling surface layer (50–100 grams per sq. ft. of grooved surface boiling layer) when complete fouling had occurred.

Next the concentration factor was increased to 3.0 where both $CaSO_4$ and $CaSO_4 \cdot \frac{1}{2}H_2O$ were above saturation. The pH of the feed in this test was reduced to prevent the other scale formers from precipitating. The heat transfer characteristics of the grooved surface boiling layer again deteriorated to a coefficient of about 750 indicating scaling. Hydrochloric acid was again added in the same concentration as before, but no carbon dioxide evolved in this case indicating absence of $CaCO_3$. The boiling coefficient again returned to about 3,000 B.t.u./hr-ft.$^2$-° F., showing that $CaSO_4$ scale can be removed by washing with acid. The system was then operated for several days under conditions where all of the major scale-forming compounds ($CaCO_3$, $CaSO_4$, and $Mg(OH)_2$) were below their solubility limits at the boiling point.

TABLE IV

| | Material | Grooves per inch | Depth of first-formed grooves (mils) | Depth of second-formed grooves (mils) | Included angle of scoring tool [2] |
|---|---|---|---|---|---|
| Surface: | | | | | |
| 1 | Copper | 60 | 23 | 8 | 30 |
| 2 | 30% Cu [1], 67% Ni | 83 | 8 | 6 | |
| 3 | 30% Cu [1], 67% Ni | 200 | 11 | 8 | |
| 4 | Nickel | 140 | 8 | 8 | |
| 5 | 70% Cu, 30% Ni | 100 | 8 | [3] 4 | |
| 6 | 90% Cu, 10% Ni | 140 | 8 | [3] 4 | |
| 7 | Aluminum | 45 | 8 | 8 | 30 |
| 8 | do | 100 | 8 | 8 | 30 |
| 9 | do | 120 | 8 | 4 | 45 |
| 10 | do | 225 | 8 | 8 | 30 |

[1] Balance of 3% is Fe, Mn and trace elements.
[2] Angle of scoring tool inclination is +10° for all surfaces except as noted.
[3] Angle of scoring tool inclination is 0°.

Inspection of FIGURE 21 reveals that in general the higher groove density surfaces performed more efficiently, compare for example surfaces 5–6 and surfaces 7–8. This is the same conclusion drawn with the single-direction scored surfaces of FIGURE 20, and again is attributed to the relatively low surface tension of liquid nitrogen. Another conclusion from FIGURE 21 is that remarkable improvement in boiling heat transfer efficiency can be achieved using virtually any type of metal with the surface of this invention. That is, all surfaces 1–10 demonstrated far higher effectiveness than the smooth surfaces.

It has been demonstrated that the boiling surface layers of this invention afford remarkably high heat transfer coefficients in sea water brine under brine-scaling conditions. Moreover it was found that when scale-forming conditions were established such that the boiling surface layers became fouled and the coefficient dropped, the original heat transfer performance of the surface was completely restored by adding 0.52 HCl to the sea water. This hydrochloric acid dissolved the scale on the grooved layer.

More particularly, the cross-scored copper surface

The boiling coefficient remained constant at about 3,000, indicating that scaling had caused no permanent deterioration of the grooved surface layer. This coefficient is about 10 times greater than achievable with an equivalent smooth metal surface under the same operating conditions.

What is claimed is:

1. A method for forming a boiling surface layer from a thermally conductive metal wall comprising the steps of:
    (a) cutting a series of parallel first grooves at microscopic density in said wall so as to form first ridges separating adjacent grooves, the outer sections of each ridge from a given groove being partly deformed into an adjacent groove; and
    (b) cutting a series of parallel second grooves at microscopic density in said wall at an angle to the orientation of said first ridges so as to form second ridges separating adjacent second grooves, and also form a plurality of sub-surface cavities in said first grooves communicating with the outer surface through restricted openings having smaller cross-sectional area than the largest cross-sectional area of the cavity interiors, and sub-surface openings between at least some adjacent cavities providing fluid communication therebetween.

2. A method for forming a boiling surface layer from a thermally conductive metal wall comprising the steps of providing a scoring tool and cutting with said tool a series of parallel groves at microscopic density in said wall so as to upwardly displace material from the grooves outwardly from the tool to form microscopic ridges separating adjacent grooves, the outer sections of each ridge from a given groove being partly deformed into an adjacent groove such that a plurality of sub-surface cavities are formed communicating with the outer surface through restricted openings having smaller cross-sectional area than the largest cross-sectional area of the cavity interiors, along with sub-surface openings between at least some adjacent cavities providing fluid communication therebetween.

3. A method according to claim 2 in which the grooves are provided at density of greater than about 20 grooves per inch.

4. A method according to claim 2 with the additional step of cutting a series of spaced parallel depressions in said wall at microscopic density 90 degrees to the orientation of said ridges.

5. A method for forming a boiling surface layer from a thermally conductive metal wall comprising the steps of:
 (a) providing a scoring tool and cutting with said tool a series of parallel first grooves at microscopic density in said wall so as to upwardly displace material from the first grooves outwardly from the tool to form first ridges separating adjacent first grooves, the outer sections of each ridge from a given groove being partly deformed into an adjacent groove; and
 (b) cutting with the scoring tool a series of parallel second grooves at microscopic density in said wall at 90 degrees to the orientation of said first ridges so as to upwardly displace material from the second grooves outwardly from the tool to form second ridges separating adjacent second grooves, and also redisplace the material from said first grooves to form both a plurality of sub-surface cavities communicating with the outer surface through restricted openings having smaller cross-sectional area than the largest cross-sectional area of the cavity interiors, and sub-surface openings between at least some adjacent cavities providing fluid communication therebetween.

6. A method according to claim 5 in which said first and second grooves are provided at density of greater than about 20 grooves per inch.

References Cited

UNITED STATES PATENTS 925,028   6/1909   Richards _____ 72—377

CHARLES W. LANHAM, Primary Examiner

E. M. COMBS, Assistant Examiner

U.S. Cl. X.R.

72—377, 379; 90—11